(12) United States Patent
Mukhtar et al.

(10) Patent No.: US 7,269,561 B2
(45) Date of Patent: Sep. 11, 2007

(54) BANDWIDTH EFFICIENT DIGITAL VOICE COMMUNICATION SYSTEM AND METHOD

(75) Inventors: Adeel Mukhtar, Coral Springs, FL (US); Deepak P. Ahya, Plantation, FL (US); Daniel A. Baudino, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 78 days.

(21) Appl. No.: 11/110,126

(22) Filed: Apr. 19, 2005

(65) Prior Publication Data

US 2006/0235692 A1    Oct. 19, 2006

(51) Int. Cl.
*G10L 13/08* (2006.01)
(52) U.S. Cl. .................. 704/270; 704/235; 704/260
(58) Field of Classification Search .............. None
See application file for complete search history.

(56) References Cited

U.S. PATENT DOCUMENTS 4,661,915 A * 4/1987 Ott ...................... 704/254
5,729,694 A * 3/1998 Holzrichter et al. ........ 705/17
2005/0261907 A1* 11/2005 Smolenski et al. ......... 704/270

* cited by examiner

*Primary Examiner*—Abul K. Azad

(57) ABSTRACT

A bandwidth efficient digital voice communication system (10) can include a speech-to-text converter (22) for converting a voice signal to a text representation, a speech parameter extractor (28) for extracting user identifiable parameters from a voice signal, and a text-to-speech converter (44) for converting the text representation and the user identifiable parameters from the voice signal in real time. The user identifiable parameters can be among pitch rate, gain, fundamental frequency, and formats. The speech-to-text converter can further include a text to phoneme segmentation module (24) providing flags to indicate a plurality of phoneme boundaries, an automatic phonetic segmentation module (26) coupled to the text to phoneme segmentation module and the speech parameter extractor, and a voice parameter manager (29) for receiving the text representation, the flags indicative of the plurality of phoneme boundaries, and the user identifiable parameters from the voice signal.

20 Claims, 5 Drawing Sheets

BANDWIDTH EFFICIENT DIGITAL VOICE COMMUNICATION SYSTEM AND METHOD

FIELD OF THE INVENTION

This invention relates generally to a bandwidth efficient digital communication system, and more particularly to a method and system for efficiently communicating voice using speech-to-text and text-to-speech technologies.

BACKGROUND OF THE INVENTION

Broadband wired or wireless IP networks for VoIP (Voice over IP) are prone to problems of packet loss and congestion, resulting in drop calls or other problems. If high error rates or congestion is detected in the network, a call is typically dropped or voice quality suffers under such conditions. Existing voice coding schemes fail to use alternative bandwidth efficient coding schemes in real time that adequately maintains a user's identity and intelligibility. Thus, existing systems either make inefficient use of available bandwidth or sacrifice voice quality to the extent that a user's voice is unrecognizable or unintelligible.

SUMMARY OF THE INVENTION

Embodiments in accordance with the present invention can provide a bandwidth efficient voice communication system and method using speech-to-text, vocoder, and text-to-speech technologies. Although such a system is bandwidth efficient, reasonable voice quality is maintained.

In a first embodiment of the present invention, a bandwidth efficient digital voice communication system can include a speech-to-text converter for converting a voice signal to a text representation, a speech parameter extractor for extracting user identifiable parameters from a voice signal, and a text-to-speech converter for converting the text representation and the user identifiable parameters from the voice signal in real time. The user identifiable parameters can be among pitch rate, gain, fundamental frequency, and formats. The speech-to-text converter can further include a text to phoneme segmentation module providing flags to indicate a plurality of phoneme boundaries, an automatic phonetic segmentation module coupled to the text to phoneme segmentation module and the speech parameter extractor, and a voice parameter manager for receiving the text representation, the flags indicative of the plurality of phoneme boundaries, and the user identifiable parameters from the voice signal. The text-to-speech converter can further include a voice parameter selector coupled to a prosody generator and a speech signal synthesizer and optionally include pre-stored text-to-speech voice parameters in a memory. Note, the speech parameter extractor enables a variable rate coding scheme by selectively transmitting at least one among a complete set of user identifiable parameters and a subset of the complete set.

In a second embodiment of the present invention, a mobile phone device can include a transceiver coupled to a microphone and an audio output device and at least one processor coupled to the transceiver. The processor can be programmed to receive a voice input signal from a user, convert the voice input signal to a user's text representation, extract speech parameters from the voice input signal, and synthesize speech using the user's text representation of the voice input signal and speech parameters from the caller to provide a real time synthesized voice signal substantially preserving an identity of the caller. The processor can be programmed to transmit the user's text representation and speech parameters extracted from the voice input signal to a receiver that performs the step of synthesizing the user's text representation using the speech parameters extracted from the voice input signal. The processor can also synthesize and preserve the identity of the caller, intelligibility, and prosody from the speech parameters for each phoneme in the text representation from the caller. The processor can convert the voice input by segmenting phonemes and providing flags to indicate a plurality of phoneme boundaries. As noted with respect to the system above, the processor can convert, extract, and synthesize speech using a variable rate coding scheme by selectively transmitting a complete set of user identifiable parameters or a subset of the complete set.

In a third embodiment of the present invention, a method of voice communication can include the steps of receiving a voice input signal from a user, converting the voice input signal to a text representation, and extracting speech parameters from the voice input signal. The method can further include the step at a receiver of synthesizing speech using the text representation of the voice input signal and the speech parameters to provide a real time synthesized voice signal substantially preserving an identity of the user. The method can further include the step of transmitting the text representation and speech parameters to a receiver that performs the step of synthesizing. Note, the step of synthesizing can preserve the identity of the user, intelligibility, and prosody from the speech parameters for each phoneme in the text representation. The step of converting the voice input can further include segmenting phonemes and providing flags to indicate a plurality of phoneme boundaries. The steps of converting, extracting, and synthesizing can provide a variable rate coding scheme by selectively transmitting either a complete set of user identifiable parameters or a subset of the complete set. The method can further include the steps of monitoring a signal quality on a voice communication system and switching to the variable rate coding scheme using the subset of the complete set and allocating bandwidth resources to a forward error correction scheme when detecting poor signal quality. The method can also include the step of creating a voice profile automatically over time through analysis at the receiver where the voice profile contains training parameters stored at the receiver for a particular caller corresponding to the voice profile.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

While the specification concludes with claims defining the features of embodiments of the invention that are regarded as novel, it is believed that the invention will be better understood from a consideration of the following description in conjunction with the figures.

A listener in two-way voice communication can associate a particular voice to a particular talker or user. Such distinction can be made due to unique voice characteristics of each talker. Such unique voice characteristics can include gain, pitch, pitch period, fundamental frequency, and formats. Knowledge of voice characteristics of a talker along with Speech-to-Text (STT) and Text-to-Speech (TTS) technologies can be used to define a unique bandwidth efficient communication method and system that can utilize a very low bit-rate speech-coding scheme. Although embodiments herein are not necessarily limited to using a low bit-rate speech coding scheme, a very low bit rate coder can be used to provide reasonable voice quality over a communication network.

Figure 1:
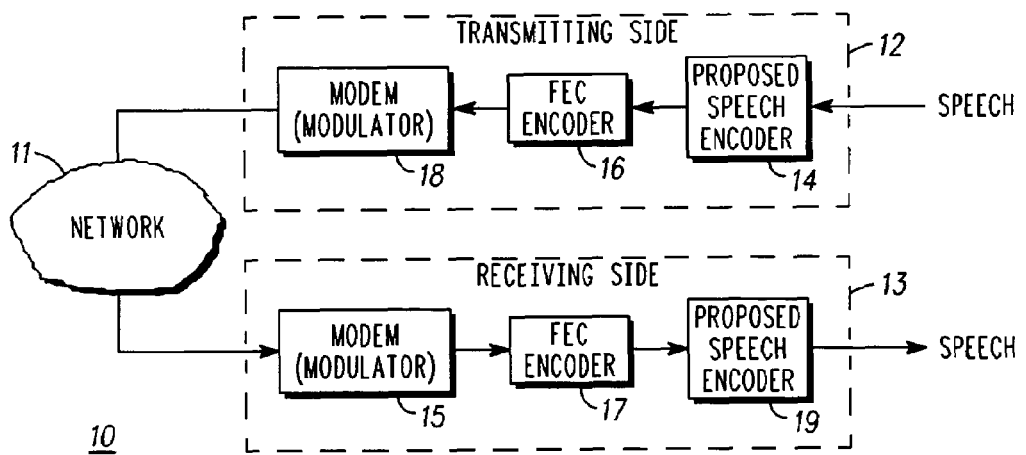
FIG. 1 is a block diagram of a bandwidth efficient digital voice communication system in accordance with an embodiment of the present invention.

Referring to FIG. 1, a high-level overview of a bandwidth efficient digital voice communication system 10 is shown. The communication system 10 can include a transmitting portion or side 12 (or transmitter) having a speech encoder 14 which uses a speech-to-text converter and additional speech processing units for speech parameter extraction and management. The output of speech encoder 12 can be forwarded to a forward error correction (FEC) encoder 16 for channel coding and finally the signal can be transmitted via a modem 18 via a network 11. On the receiving portion or side 13, the received symbols are demodulated by a modem 15, channel decoded by an FEC decoder 17 and passed to a speech decoder 19. The speech decoder 19 can employ a text-to-speech converter and additional processing units and converts the text and corresponding voice parameters into a speech output signal at the receiving side 11 (or receiver).

Figure 2:
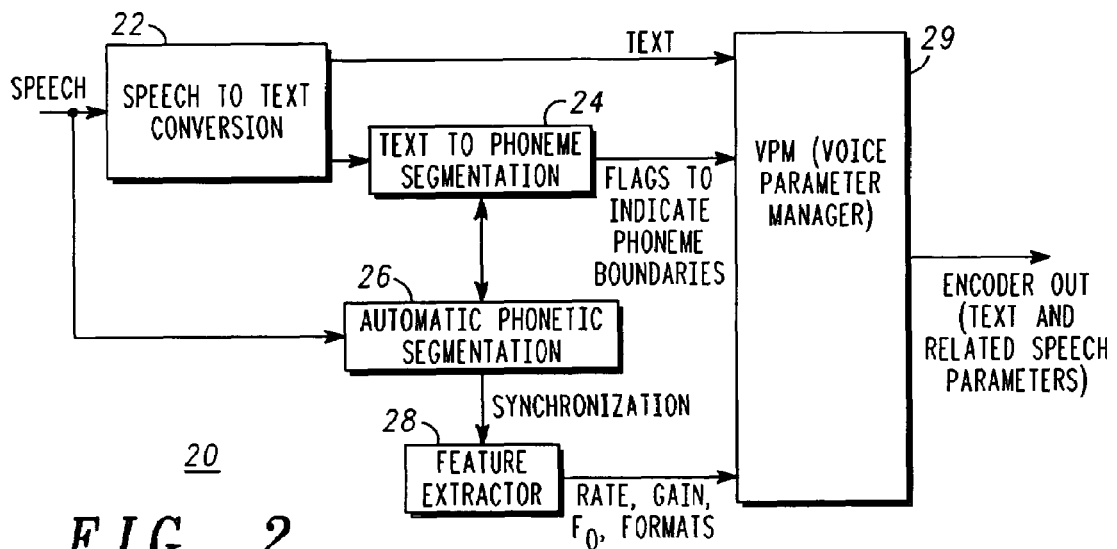
FIG. 2 is a block diagram of a speech encoding portion of a transceiver or transmitter portion of the transceiver in accordance with an embodiment of the present invention.

Referring to FIG. 2, a block diagram of an encoder at a transmitter 20 is shown. The speech signal can be converted to a corresponding text using a phoneme based (particularly for its high accuracy) or a word based voice recognition (VR) engine. The speech signal is analyzed and words are converted to phonemes for parameter extraction using a speech-to-text converter 22, a text-to-phoneme segmentation block or module 24 and a feature extractor 28. Since the speech to phoneme conversion is a known art and often used by speech-to-text engines, an 'Automatic Phonetic Segmentation' block 26 is optional if a phoneme based STT engine is used. The encoder at the transmitter 20 can include a voice parameter manager 29 that receives the text from the speech-to-text converter 22, a plurality of flags indicating the boundaries for the phonemes from the text-to-phoneme segmentation module 24, and a plurality of parameters from the feature extractor 28. The voice parameter manager 29 then provides an output that includes the text and corresponding parameters.

Operationally, the key characteristics of the talker, such as gain, pitch and formats are extracted for each phoneme. The pitch period or fundamental frequency of speech varies from one individual to another and is a suitable parameter to distinguish one speaker from another. Formats are the resonant frequencies of the vocal tract and can be used to good effect for speaker identification with a high probability likely due to different vocal-tract configurations for the same utterance for different speakers. Hence utilizing both pitch (and pitch variations) and formats results in a reasonably accurate characterization of talker's voice. The estimation of pitch or fundamental frequency (F0), formats (F1, F2, F3 etc.) and gain is possible using known speech processing techniques. The gain can be estimated, converted to a dB value and then quantized for example, to 32 levels, resulting in 5 bits needed to transmit gain information. For pitch frequency, 10 bits (or even less) is sufficient as the pitch frequencies of most talkers are under 1000 Hz. A formant can be defined by magnitude, frequency, and bandwidth. For a speech signal band-limited to 4 KHz, a total 27 bits can define a formant (5 bits for gain, 12 for formant location/frequency, and 10 bits for formant bandwidth). Although all phonemes have their own formats, vowel sound formats are the easiest to identify and usually it is enough to identify the first two or three formats. A detailed example of feature extraction using known signal processing techniques and speech synthesis simulation results are explained in further detail with respect to FIGS. 6-9.

The Text to Phoneme Segmentation block 24 as shown in FIG. 2 (commonly used in TTS systems) identifies phoneme boundaries within a word. Block 24 can be synchronized with the Automatic Phonetic Segmentation module 26 in order to correctly attach the speech parameters to each phoneme. The output flags are the addresses of the memory location where text corresponding to each phoneme is stored.

Figure 3:
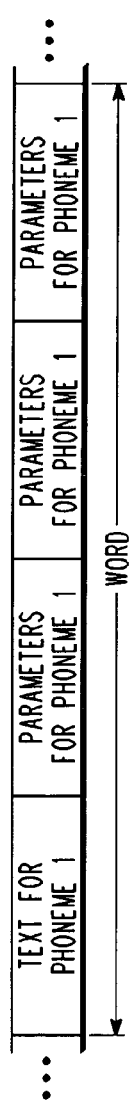
FIG. 3 is a word frame illustrating transmission of text and corresponding parameters between a transmitting device and a receiving device in accordance with an embodiment of the present invention.

The Voice Parameter Manager (VPM) 29 tags speech parameters to each phoneme in an output word (text) from the STT engine or converter 22, and prepares the frames for transmission. The input to VPM 29 is text (word) from the STT 22, flags indicating phonetic boundary within a word from the text-to-phoneme segmentation module 24, and voice parameters (equivalent to each phoneme) from the parameter extraction module 28. The output of VPM 29 is text with relative voice parameters for each phoneme within the word, formatted in the frame structure 30 shown in FIG. 3. Since only text and relative speech parameters are transmitted at a very low update rate as compared to a typical vocoder, embodiments herein allow voice communication at a very low data rate compared to a traditional digital communication system. As will be explained in further detail below, a proposed coder in accordance with the embodiments herein can operate at a rate under 1000 bits-per-second (bps) if gain, rate, pitch and formant information is used. If an application requires further reduction in bandwidth, only gain, rate and pitch information can be utilized for synthesis. Using only gain, rate, and pitch information can result in a coding rate under 300 bps with a sacrifice in voice quality in terms of talker identification.

Since it can be difficult to capture a voice fingerprint at the first word, a conventional vocoder can be used in one embodiment to communicate spoken words at the start of the message. Also, at the start of the message, the voice characteristics are captured and digitized. When the voice characteristics are captured and digitized, a template can be sent to the recipient, and speech-to-text mode can begin. At this point, the communication can continue using the efficient bandwidth techniques described herein. Also, as unique voice parameters are continuously sent with text, the system does not necessarily require any algorithm to detect a new user since it can be accomplished automatically based on input speech. In one embodiment, the proposed scheme can use phoneme segmentation rather than word based processing. A potential problem with the word based processing involve long words that introduce long latencies and a mix of long and short words that can cause jitter. Segmenting the words into smaller components (phonemes), on the other hand, mitigates the long latency or large jitter. Also, in order to maintain real time communication, a jitter buffer management based scheme (known in the art) can be used.

In another embodiment of the invention, a talker's speech rate can also be estimated at the encoder and transmitted for the decoder to use for synthesis (note: most TTS engines allow rate control by the user). Rate estimation can be accomplished in a number of ways. For example, phoneme per word is one indicator of the rate and can be estimated using the information from the Automatic Phonetic Segmentation module 26 in the encoder. Note that the transmitting rate information does not have much impact on overall coder rate as it only needs 4 bits (per word) and is not updated for every phoneme.

Most digital communication systems employ a vocoder for voice communications. In one embodiment, a CELP-based speech encoder (e.g., VSELP) can be used to extract the voice characterization parameters (such as pitch, formant, and gain), unique to a talker. For example, a Lag parameter (L) in a transfer function of the long-term filter in a VSELP encoder can be used to calculate pitch period. The formats information can be abstracted from short-term filter coefficients or reflection coefficients. These reflection coefficients can be translated to an equivalent Infinite Impulse Response (IIR) filter and the impulse response of this IIR filter can provide the formats information (such as frequency, bandwidth and magnitude). Note that the speech encoder usually operates on 20 ms to 40 ms time windows (or frames), that is, speech parameters are extracted for small time frames. But some embodiments herein need speech parameters for each phoneme whose duration is usually longer than the frame size of the vocoder. In order to solve this problem, the vocoder can be used to estimate voice parameters on a per frame basis (normal operations), but the values of the parameters can be averaged for each phoneme duration and tagged to the phoneme.

Figure 4:
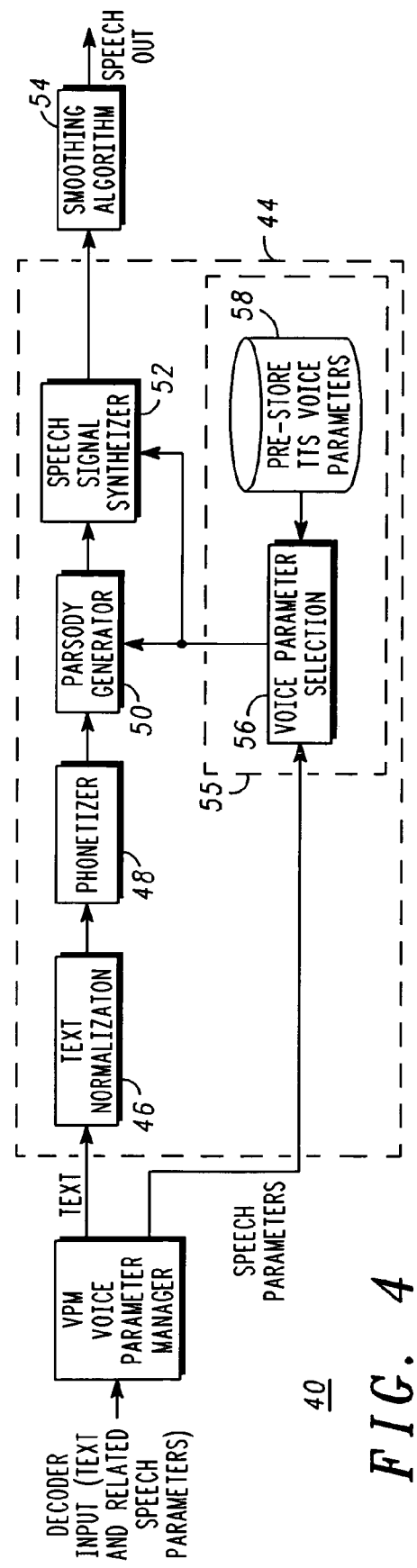
FIG. 4 is a block diagram of a speech decoding portion of a transceiver or receiver portion of the transceiver in accordance with an embodiment of the present invention.

On the receive side, the received text and voice parameters are used to produce speech using a parametric text-to-speech engine or converter 44. Referring once again to FIG. 4, a block diagram of the decoding scheme is shown including the VPM module 42 which splits input text and voice parameters and passes them to the TTS engine 44, modified to utilize received speech parameters. The text is normalized at block 46 and then using the voice parameters along with the text, is converted and synthesized using the phonetizer 48, prosody generator 50, and speech signal synthesizer 52. The received voice parameters are used in addition with the parameters stored locally in the store or memory 58. The received parameters as well as the pre-stored ones (collectively, parameters 55) can be selectively fed to the prosody generator 50 and the synthesizer 52 using a voice parameter selector 56. The received parameters can be rate, pitch, formant and gain and the parameters stored at the local engine can be sound sources for voicing, aspiration noise, frication noise or other parameters. Using a combination of both, the speech signal is synthesized generating the output of the TTS module. Since different speech parameters are used for each phoneme during the synthesis, a HMM (Hidden Markov Model) based smoothing algorithm 54 can also be used to reduce discontinuous distortion in naturalness occurred at the transition portion between phonemes. Smoothing algorithms are often used in concatenation-based speech synthesis algorithms to enhance the quality of synthesized speech. The embodiments described herein can use text with prosody information (such as gain, pitch/intonation, formats, rate), which results in high intelligibility and reasonably high voice quality as the systems and techniques described herein preserve a caller's unique voice characteristics.

Figure 5:
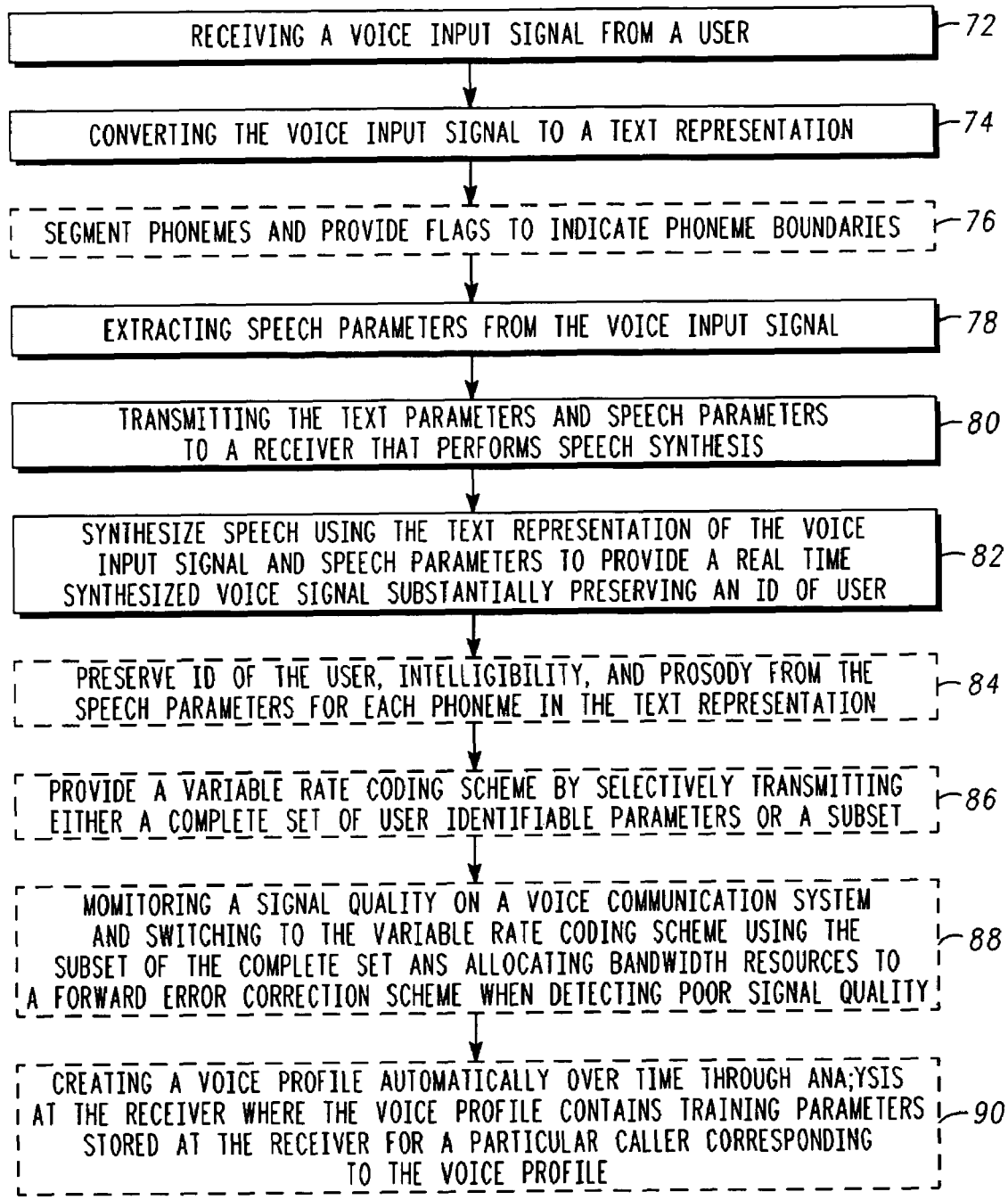
FIG. 5 is a flow chart illustrating a method of voice communication in accordance with an embodiment of the present invention.

Referring to FIG. 5, a flow chart illustrating a method 70 of voice communication can include the step 72 of receiving a voice input signal from a user, converting the voice input signal to a text representation at step 74, and extracting speech parameters from the voice input signal at step 78. Note, converting the voice input can further include the step 76 of segmenting phonemes and providing flags to indicate a plurality of phoneme boundaries. The method 70 can further include the step 80 of transmitting the text representation and speech parameters to a receiver that performs the step 82 of synthesizing. At step 82 at a receiver, speech is synthesized using the text representation of the voice input signal and the speech parameters to provide a real time synthesized voice signal substantially preserving an identity of the user. Note, the step of synthesizing can preserve the identity of the user, intelligibility, and prosody from the speech parameters for each phoneme in the text representation as noted at step 84. The steps of converting, extracting, and synthesizing can optionally provide at step 86 a variable rate coding scheme by selectively transmitting either a complete set of user identifiable parameters or a subset of the complete set. The method 70 can further include the optional steps of monitoring a signal quality on a voice communication system and switching to the variable rate coding scheme using the subset of the complete set and allocating bandwidth resources to a forward error correction scheme when detecting poor signal quality at step 88. The method 70 can also include the step 90 of creating a voice profile automatically over time through analysis at the receiver where the voice profile contains training parameters stored at the receiver for a particular caller corresponding to the voice profile.

Figure 6:
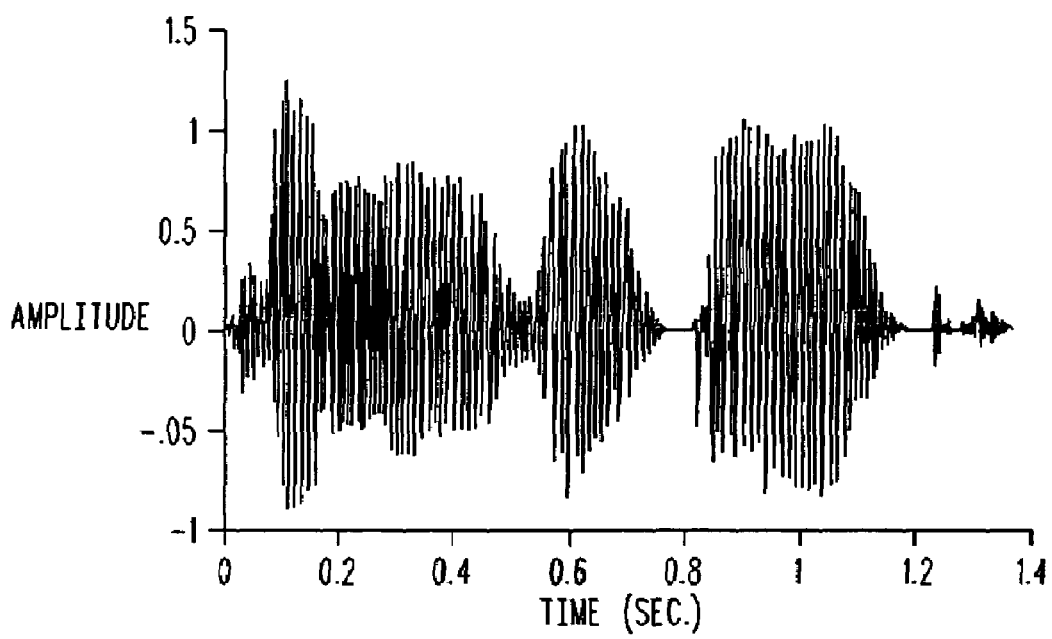
FIG. 6 is a speech waveform sample in accordance with an embodiment of the present invention.
Figure 7:
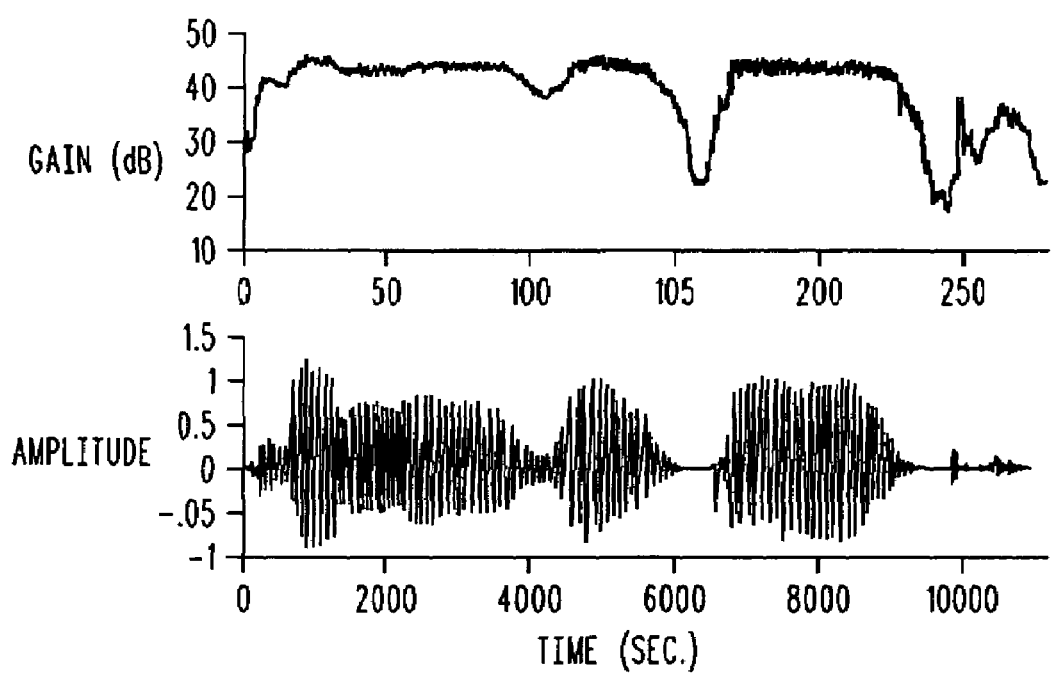
FIG. 7 is a timing diagram illustrating gain variations for the recorded speech waveform sample of FIG. 6 in accordance with an embodiment of the present invention.
Figure 8:
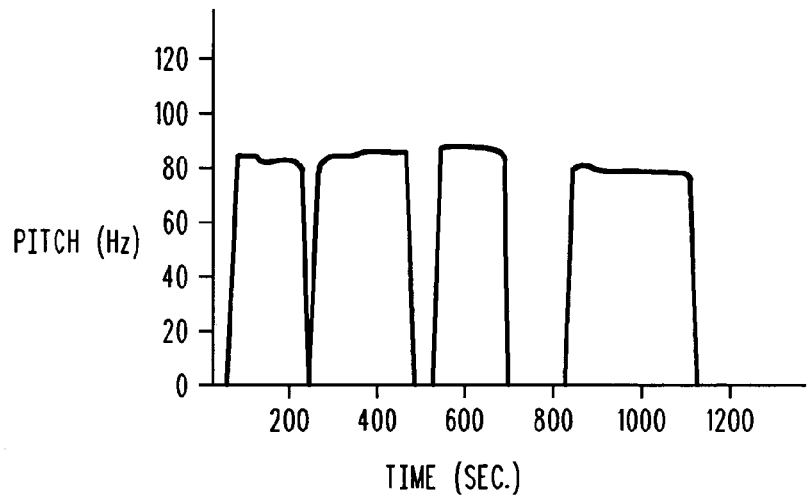
FIG. 8 is a pitch track of the recorded speech waveform sample of FIG. 6 in accordance with an embodiment of the present invention.
Figure 9:
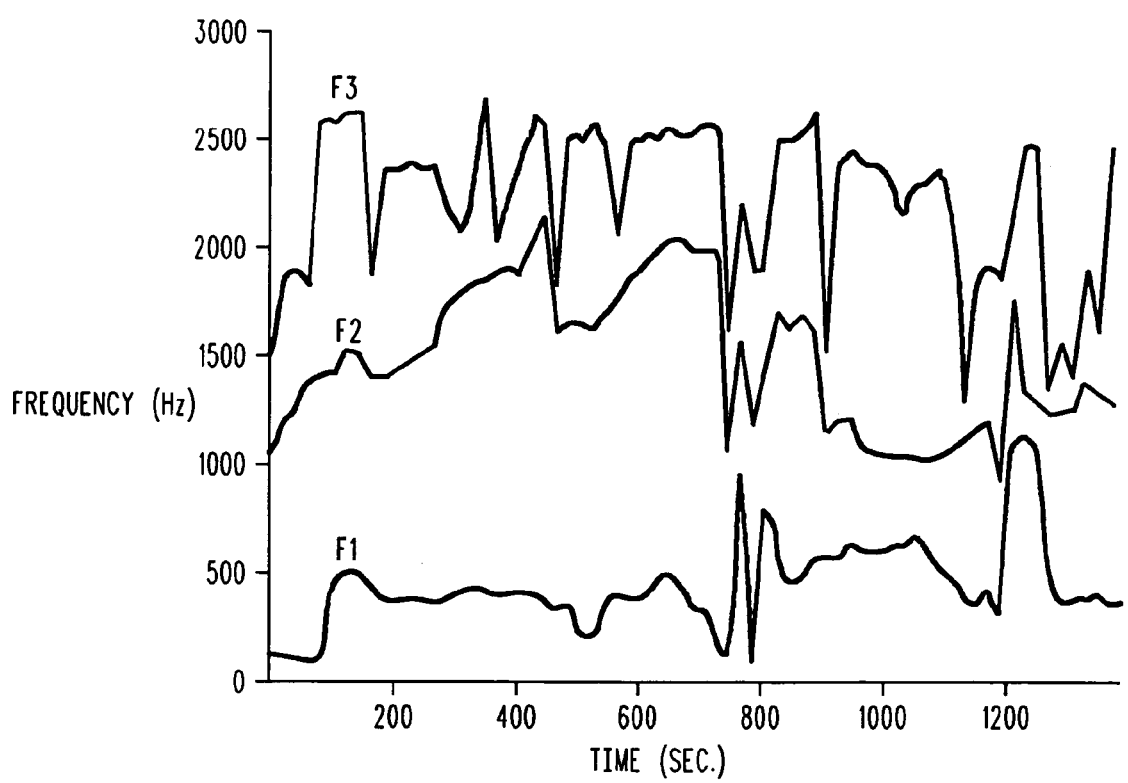
FIG. 9 is a formant track for the first 3 formats of the recorded speech waveform sample of FIG. 6 in accordance with an embodiment of the present invention.

Referring to FIG. 6, a time waveform of a recorded speech for a phrase "The lazy Dog" (male talker of age 33) is illustrated. The speech sample has been analyzed with known signal processing techniques to estimate key parameters such as amplitude/gain, pitch (using cepstrum analysis) and formats. The plots of gain, pitch contour, and formats tracks are further illustrated in FIGS. 7, 8, and 9 respectively.

The estimated average pitch and rate can be used with a TTS engine to synthesize any voice input. Although modifying any TTS engine to use all the voice parameters (pitch, pitch variations, formats, rate, and gain) can take a bit of effort, a simpler TTS engine can synthesize just using average pitch and rate. Note that the quality of synthesized speech is good in terms of intelligibility and further if particular voice parameters (such as pitch variations/how pitch changes with time and formats) are used at a synthesis stage, then the synthesized speech will be both intelligible and natural.

In a specific example, the recorded phrase ("The lazy dog.") illustrated in FIGS. 6-9, can demonstrate how a reduction in bit rate can be achieved. This phrase has 13 characters (including spaces and a period) and the text representation will require 104 bits. The duration of this sentence is approximately 1.4 seconds (based on the recording shown in FIG. 6) and it contains 9 phonemes. Based on an assumption, voice parameters for each phoneme can be defined with 96 bits, that is: gain: 5 bits; pitch: 10 bits; and three formats: 81 bits.

Since there are 9 phonemes, 864 bits are needed for voice parameters and 104 bits are needed for text, resulting in a data rate of approximately 690 bps. Note, if only pitch and gain information is utilized for synthesis, the coder rate can be as low as approximately 170 bps. Note that the coder rate depends on the rate of the speech, but for all practical purposes, the average rate of most speech can be under 1000 bps if all voice parameters are used and under 300 bps if only rate, gain and pitch information is used. These rates are much less than vocoders rates, which typically run at rates ranging from 4000 to 8000 bits per second.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A bandwidth efficient digital voice communication system, comprising:
    a speech-to-text converter for converting a voice signal to a text representation;
    a speech parameter extractor for extracting user identifiable parameters from the voice signal, wherein the speech-to-text converter includes a voice parameter manager that synthesizes the text representation and the user identifiable parameters; and
    a text-to-speech converter for converting in real time the text representation and the user identifiable parameters into the user's voice signal.

2. The system of claim 1, wherein the speech-to-text converter further comprises a text to phoneme segmentation module providing flags to indicate a plurality of phoneme boundaries.

3. The system of claim 2, wherein the speech-to-text converter further comprises an automatic phonetic segmentation module coupled to the text to phoneme segmentation module and to the speech parameter extractor.

4. The system of claim 2, wherein the voice parameter manager also receives the flags indicative of the plurality of phoneme boundaries.

5. The system of claim 1, wherein the user identifiable parameters are selected among pitch rate, gain, fundamental frequency, and formats.

6. The system of claim 1, wherein the text-to-speech converter further comprise a voice parameter selector coupled to a prosody generator and a speech signal synthesizer.

7. The system of claim 1, wherein the text-to-speech converter further comprises pre-stored text-to-speech voice parameters.

8. The system of claim 1, wherein the speech parameter extractor enables a variable rate coding scheme by selectively transmitting at least one among a complete set of user identifiable parameters and a subset of the complete set.

9. The system of claim 1, wherein the speech parameter extractor comprises a vocoder for extracting the user identifiable parameters at a transmitter and wherein a receiver uses the user identifiable parameters to synthesize speech in a manner substantially preserving a user identity.

10. A mobile phone device, comprising:
    a transceiver coupled to a microphone and an audio output device; and
    at least one processor coupled to the transceiver, wherein the processor is programmed to:
    receive a voice input signal from a user;
    convert the voice input signal to a users text representation;
    extract speech parameters from the voice input signal; and
    synthesize speech using the user's text representation of the voice input signal and speech parameters from the caller to provide a real time synthesized voice signal substantially preserving an identity parameters of the caller.

11. The mobile phone of claim 10, wherein the at least one processor is further programmed to transmit the user's text representation and speech parameters extracted from the voice input signal to a receiver that performs the step of synthesizing the user's text representation using the speech parameters extracted from the voice input signal.

12. The mobile phone of claim 10, wherein the at least one processor synthesizes and preserves the identity of the caller, intelligibility, and prosody from the speech parameters for each phoneme in the text representation from the caller.

13. The mobile phone of claim 10, wherein the at least one processor converts the voice input by segmenting phonemes and providing flags to indicate a plurality of phoneme boundaries.

14. The mobile phone of claim 10, wherein the at least one processor converts, extracts, and synthesizes using a variable rate coding scheme by selectively transmitting at least one among a complete set of user identifiable parameters and a subset of the complete set.

15. A method of voice communication, comprising the steps of:
    receiving a voice input signal from a user;
    converting the voice input signal to a text representation;
    extracting speech parameters from the voice input signal; and
    at a receiver, synthesizing speech using the text representation of the voice input signal and the speech parameters to provide a real time synthesized voice signal substantially preserving an identity parameters of the user.

16. The method of claim 15, wherein the method further comprises the step of transmitting the text representation and speech parameters to a receiver that performs the step of synthesizing.

17. The method of claim 15, wherein the step of synthesizing preserves the identity of the user, intelligibility, and prosody from the speech parameters for each phoneme in the text representation.

18. The method of claim 15, wherein the steps of converting, extracting, and synthesizing comprises the step of using a variable rate coding scheme by selectively transmitting at least one among a complete set of user identifiable parameters and a subset of the complete set.

19. The method of claim 18, wherein the method further comprises the step of monitoring a signal quality on a voice communication system and switching to the variable rate coding scheme using the subset of the complete set and allocating bandwidth resources to a forward error correction scheme when detecting poor signal quality.

20. The method of claim 15, wherein the method further comprises the step of creating a voice profile automatically over time through analysis at the receiver, the voice profile containing training parameters stored at the receiver for a particular caller corresponding to the voice profile.

* * * * *